Patented June 17, 1952

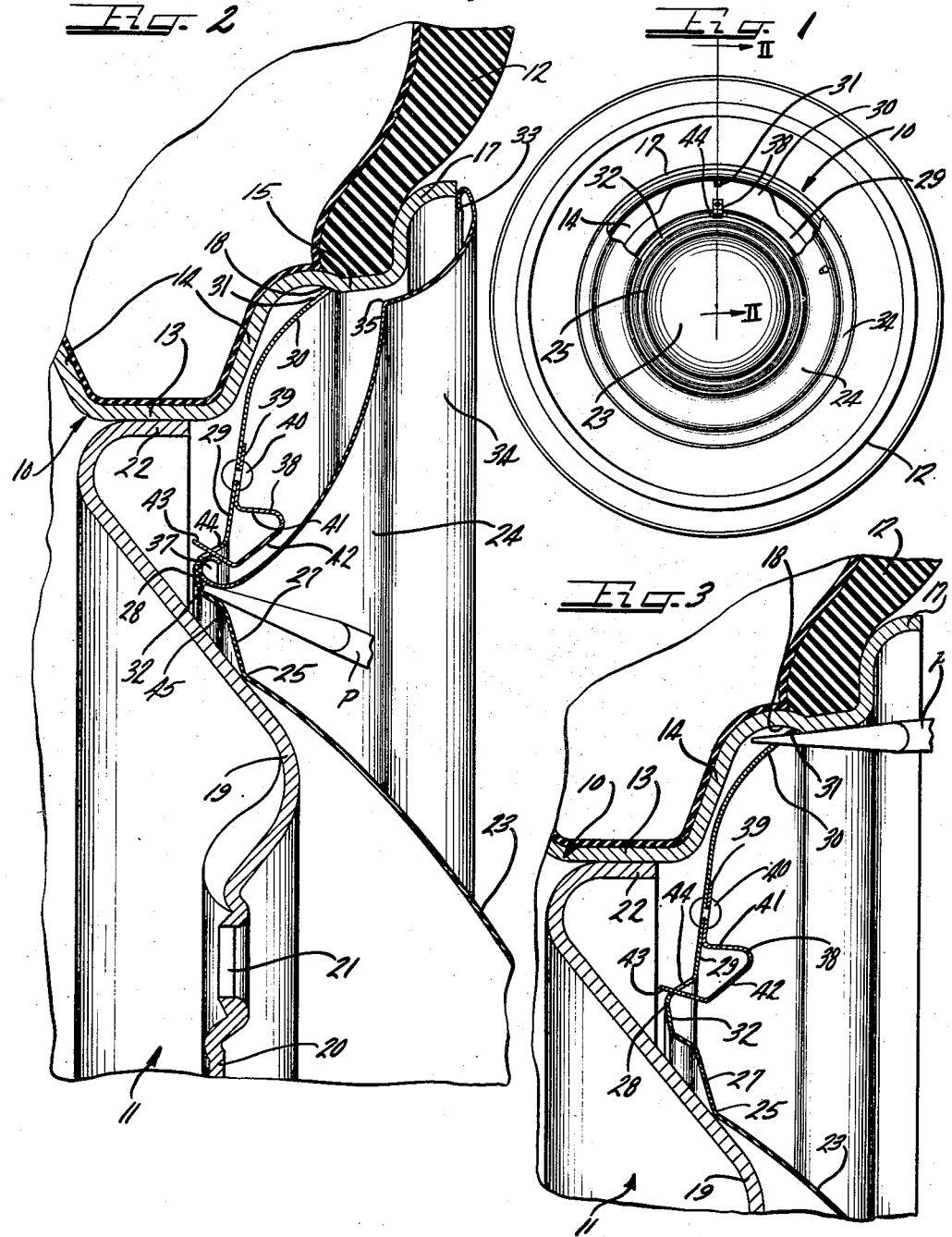

2,600,412

UNITED STATES PATENT OFFICE 2,600,412

WHEEL COVER STRUCTURE

George Albert Lyon, Detroit, Mich.

Application September 30, 1947, Serial No. 776,973

10 Claims. (Cl. 301—37)

This invention relates to improvements in wheel cover structure and more particularly concerns improvements in vehicle wheels and cover structures therefor.

An important object of the present invention is to provide a two part cover assembly which is detachably assembled and is arranged to be removably mounted on the outer side of a vehicle wheel.

Another object is to provide an improved multi-part wheel cover assembly in which the cover components are constructed and arranged in a novel manner to facilitate assembly thereof, but also affording efficient means for enabling quick and easy separation thereof when desired.

A further object of the invention is to provide an improved self-retaining vehicle wheel cover.

An additional object of the invention is to provide a novel vehicle wheel structure.

According to the general features of the present invention there is provided in a wheel structure including a multi-flanged tire rim and a load sustaining body part, a wheel cover including a central cover portion having generally radially extending peripheral finger members retainingly engageable with the exterior surface of an intermediate flange of the tire rim and including a flange structure at the base of said finger members, said flange structure having mounted thereon retaining spring clips, and a cover annulus of a size to substantially cover the tire rim and said retaining fingers as well as said flange and said retaining spring clips and engaging said spring clips in snap-on, pry-off relationship.

According to other features of the invention, the juncture of the flange with the body of the inner cover member has an annular generally outwardly opening groove receptive of the inner edge of the annular cover member and constructed at the radially inner side thereof to facilitate insertion of a pry-off tool for removing said annular cover member from retention by said clips.

According to other general features of the invention, there is provided a wheel cover structure including a circular inner cover member arranged for substantially fully covering the body portion of a vehicle wheel and having means at the periphery thereof for removable attachment to the wheel, and a trim ring cover member of a size to substantially cover the tire rim of the wheel and having the inner edge thereof in engagement with the inner cover member in concealing relation to the retaining means on the latter, and means concealed by the trim ring cover member for retaining the cover members in assembled relation and adapted to release the trim ring cover member in response to pry-off force applied to the inner edge thereof.

According to other general features of the invention, there is provided a vehicle wheel including a multi-flanged tire rim and a load sustaining body part formed from a sheet metal stamping, the outer periphery of the body part having an axially outwardly turned flange secured to the base of the tire rim and providing a free space at the outer side of the wheel adjacent to the tire rim extending axially inwardly beyond the medial plane of the wheel assembly.

Other objects, features and advantages of the present invention will be readily apparent from the following description taken in conjunction with a preferred embodiment thereof as shown on the accompanying drawings, in which:

Figure 1 is a side elevational view, partially broken away, disclosing a preferred form of the invention.

Figure 2 is an enlarged radial sectional view taken substantially on the line II—II of Figure 1; and Figure 3 is a sectional view similar to Figure 2 but showing the trim ring cover member removed for access to the retaining means on the inner cover member.

As shown on the drawings:

A wheel structure incorporating the present invention includes a tire rim 10 and a load sustaining body part 11. Both of these members are adapted to be made from suitable gauge sheet metal, the tire rim being adapted to be formed as a rolled section and the body part as a stamping.

The tire rim 10 is shown as of the multi-flanged, drop center type adapted to support a pneumatic tire and tube assembly 12. A base flange 13 of the tire rim has extending therefrom side flanges 14 which merge with generally axially extending intermediate flanges 15 from which extend generally radially outwardly axially curved respective terminal flanges 17. At least the intermediate flange 15 at the outer side of the tire rim may have a shoulder 18 which faces generally axially inwardly at the radially inner side of the flange.

The wheel body 11 comprises a disc having a reinforcing formation including an intermediate generally axially outwardly protruding annular reinforcing nose bulge 19 encircling a dished central bolt-on flange 20 which is formed with a preferred plurality of bolt apertures 21 by which the wheel is adapted to be secured to an axle portion of a vehicle wheel by means of bolts or cap screws (not shown). At the radially outer side of the nose bulge 19, the wheel body extends on a generally axially rearwardly and radially outward taper and merges on a suitable radius with an axially outwardly extending marginal flange 22 which is secured to the base flange 13 on the tire rim in any suitable manner such as by welding or by riveting. As shown, the juncture of the marginal flange 22 with the rest of the body portion 11 is in assembly with the tire rim disposed substantially axially inwardly from the medial plane of the wheel. This affords a relatively large annular groove-like space between the bulge portion of the wheel body and the tire rim.

According to the present invention, the outer side of the wheel is substantially entirely enclosed by a cover comprising separable wheel body covering and tire rim covering components 23 and 24, respectively, which are so constructed and arranged that efficient use is made of the groove-like space between the wheel body bulge 19 and the tire rim. Both of the cover members 23 and 24 are adapted to be made from sheet material such as sheet metal, the cover member 23 being formed as a stamping and the cover member 24 being formed either as a stamping or as a rolled section.

The wheel body covering member 23 is in the form of a disc centrally convexly fashioned in general simulation of a hub cap and formed at the edge of the central convex section with a generally axially inwardly directed annular rib 25 by which line contact is effected with the radially outer side of the nose bulge 19 of the wheel body. The rib 25 forms a juncture with a generally radially outwardly and slightly axially rearwardly slanting annular flange 27 which is joined by an axially inwardly projecting annular rib 28 with a divergently related marginal flange 29, the latter having a plurality of generally radially outwardly extending retaining finger portions 30 arranged to engage with the tire rim intermediate flange 15, and preferably behind the shoulder 18 for retaining the cover member 23 upon the wheel. By preference the retaining fingers 30 are formed on a curvature whereby the tips thereof are normally biased in a generally axially outward direction and on a circle which is normally of slightly greater diameter than the diameter defined by the inner surface of the intermediate flange 15. The retaining fingers 30 are, furthermore, somewhat flexible so that when the cover member 23 is pressed inwardly into assembled relation with the wheel, the retaining fingers 30 will engage the intermediate tire rim flange 15 and flex radially inwardly sufficiently to clear the axially outer portion of such flange until the tips of the fingers snap behind the tire rim flange shoulder 18 and effect a wedging biting retaining engagement therewith. The construction and relationship is such that when the fingers 30 make such retaining engagement with the shoulders 18, the contact rib 25 of the cover member makes engagement with the wheel body. Since the retaining fingers 30 are, under this retaining relationship, under tension, the cover member 23 is held securely upon the wheel. It will be apparent that by having just a line contact with the wheel body and by having the remainder of the margin of the cover member 23 spaced from the wheel body and also from the tire rim side flange 14, substantial latitude is afforded for manufacturing tolerances in the relative disposition of the tire rim 10 and the wheel body 11 in an axial direction. There may be as many of the retaining fingers 30 as desired, but in a desirable arrangement three of the fingers 30 of substantial width have been found quite suitable. The rigid structure afforded by the flanged and ribbed margin of the cover member 23 assures adequate stiffness for optimum cover retaining value from the relatively small number of retaining fingers 30.

By having the retaining fingers 30 turned axially outwardly, removal of the cover member 23 by prying one of the retaining fingers 30 free from the tire rim is facilitated. For this purpose, each of the retaining fingers 30 is formed with a central pry-off tool notch 31 in its edge, preferably in the center of the edge and receptive of a pry-off tool P such as a screwdriver (Fig. 3) which when fulcrumed against the axially outer portion of the tire rim flange 15 flexes the engaged retaining finger 30 out of retaining engagement with the tire rim shoulder 18 and effects removal of the cover member 23.

The cover member 24 is of radial dimension to extend from the tire rim terminal flange 17 to the cover member 23, preferably within an axially outwardly opening annular groove 32 afforded by the rib 28. To this end, the radially outer edge of the cover member 24 is formed with a reinforcing and finishing underturned flange 33 which may rest against the edge of the tire rim terminal flange 17. For appearance sake, or for purposes of rigidity or contrasting finish, the cover member 24 may be formed as a pair of divergent convexly cross-section annular portions, one of which is formed on a smaller radius at the radially outer margin of the annular cover member and provides a buffer rib 34 which is relatively stiff and thereby adapted for withstanding substantial pressure from obstructions such as curbing against which the side of the wheel may be driven. A generally axially inwardly extending juncture rib 35 defines the convergence of the rib-like radially outer portion of the cover member 24 with the larger radius remaining radially inner portion of the cover member.

At its radially inner edge, the cover member 24 is preferably formed with an underturned reinforcing and retaining bead 37.

Means for retaining the annular cover member 24 comprises a series of spring clips 38 carried by the flange portion 29 of the wheel body covering member 23 and which provides an annular clip-supporting land inwardly of the retaining fingers 30. In the present instance, each of the clips 38 includes a base flange 39 which is secured as by means of a rivet 40 to the cover flange 29 and disposed in a radial direction, and merging at its radially inner end with an axially outwardly extending flange 41 forming part of a generally gooseneck resilient clip head portion including a radially and axially inwardly directed oblique cam flange 42 terminating in a retaining terminal flange 43 which projects generally axially inwardly and radially outwardly and is of a length to extend through an aperture 44 formed in the radially outer side wall defining the channel of the groove 32. Through this arrangement, the retaining terminal flange 43 of the clip provides a retaining shoulder which partially overlies the groove 32 and is retainingly engageable with the bead 37 of the annular cover member 24. Before the cover member 24 is applied, the clip head resiliently expands so that the terminal flange 43 engages the radially inner edge of the aperture 44. The radial dimension of the aperture 44 is such as to afford ample clearance for radially outward movement of the terminal flange 43 when the clip head is placed under retaining tension by engagement with the cover bead 37 which is dimensioned to make final retained engagement with the radially outer sidewall defining the groove 32. The length of the aperture 44 is such as to clear the terminal flange 43 for free flexing movement but to limit any possible swivel movement that may develop in the clip should the rivet attachment thereof become loose. This assures that the clip will at all times remain in the operative position.

In order to facilitate prying the cover member 24 free from the clips 42, the groove 32 is preferably slightly wider than the cover bead 37 so that at the radially inner side of the groove 32, a gap persists in the fully assembled relationship of the cover components, such gap being defined at the radially inner side thereof by a shoulder 45 against which the tip of the pry-off tool P is adapted to fulcrum when inserted into the gap for applying pry-off force to the cover edge bead 37. The pry-off tool gap is, however, narrow enough so that any tendency of the annular cover member 24 to shift radially within the groove 32 is substantially minimized and the bead 37 is thus at all times maintained in proper retaining relation to the clips 38.

From the foregoing, it will be seen that not only is there provided a novel wheel structure in which a larger than ordinary axially inward clearance is afforded at the outer side of the wheel adjacent to the tire rim, but that there is also provided a highly desirable cover for the outer side of the wheel wherein a trim ring cover member effectively conceals not only the tire rim but also the margin of the inner wheel body covering portion of the cover assembly, including the retaining fingers by which the cover is held upon the wheel and the means by which the trim ring is held in assembly with the wheel body covering portion of the cover. The trim ring portion is adapted to be applied to the body covering portion of the cover after the latter has been applied to the wheel or the two parts of the cover previously assembled may be applied to the wheel as a unit merely by pressing the same into position co-axially with the outer side of the wheel. In order to remove the body covering portion of the cover, a trim ring portion must first be pried free so that access can be had to the portion of the cover which engages the tire rim for holding the cover on the wheel. Thus the trim ring portion protects the several retaining means. The outer side of the cover assembly affords an attractive, ornamental appearance which may be enhanced by appropriate finish of the exposed cover components.

I claim as my invention:

1. In a wheel structure including a multi-flanged tire rim and a load sustaining body part, a wheel cover including a central cover portion having generally radially extending peripheral finger members retainingly engageable with the exterior surface of an intermediate flange of the tire rim and including a flange structure at the base of said finger members, said flange structure having mounted thereon retaining spring clips, and a cover annulus of a size to substantially cover the tire rim and said retaining fingers as well as said flange and said retaining spring clips and engaging said spring clips in snap-on, pry-off relationship, the juncture of the flange with the body of the inner cover member having an annular generally outwardly opening groove receptive of the inner edge of the annular cover member and constructed at the radially inner side thereof to facilitate insertion of a pry-off tool for removing said annular cover member from retention by said clips.

2. A wheel cover structure including a circular inner cover member arranged for substantially fully covering the body portion of a vehicle wheel and having means at the periphery thereof for removable attachment to the wheel, and a trim ring cover member of a size to substantially cover the tire rim of the wheel and having the inner edge thereof in engagement with the inner cover member in concealing relation to the retaining means on the latter, and means concealed by the trim ring cover member for retaining the cover members in assembled relation and adapted to release the trim ring cover member in response to pry-off force applied to the inner edge thereof, said inner cover member having an annular groove within which said inner edge of the trim ring cover member seats in centered relation and into which said concealed retaining means urge said edge.

3. In a wheel structure including a tire rim and a load sustaining body part, the tire rim having an intermediate flange including a generally axially inwardly facing shoulder at the radially inner side thereof, a circular cover member having a portion thereof engaging the wheel body and a radially outwardly extending series of retaining fingers engageable retainingly behind said shoulder, said cover member having a plurality of separately formed spring clips mounted thereon radially inwardly from said fingers, means securing said clips to said cover member, and a trim ring cover member dimensioned to substantially conceal the tire rim and said fingers and having the inner margin thereof engaging said spring clips.

4. In a wheel structure including a tire rim and a load sustaining body part, the tire rim having an intermediate flange including a generally axially inwardly facing shoulder at the radially inner side thereof, a circular cover member having a portion thereof engaging the wheel body and a radially outwardly extending series of retaining fingers engageable retainingly behind said shoulder, said cover member having a plurality of spring clips mounted thereon radially inwardly from said fingers, and a trim ring cover member dimensioned to substantially conceal the tire rim and having the inner margin thereof releasably engaging said spring clips, said retaining fingers being turned generally axially outwardly at their tips and being adapted to be engaged, after said trim ring cover member has been released and removed, to be pried in generally radially inward direction to flex free from said shoulder to release the cover.

5. In combination in a wheel cover, a circular member having means at the radially outer side thereof for engagement with the wheel, a portion of said cover member radially inwardly from said retaining means providing an annular land, and a plurality of spring clips mounted on said land and having retaining resilient head portions thereof facing generally radially inwardly for engagement with the radially inner margin of a trim ring.

6. In a wheel cover of the character described, a disc member for substantially covering the body of a wheel to which the cover may be applied, a generally axially extending annular rib affording limited contact of the cover with the wheel body, flange structure extending generally radially beyond said rib and including means for retaining engagement with the wheel, a generally axially outwardly opening annular groove in said flange structure, an annular cover member having an edge engageable in said groove, and means on the flange structure for retaining said annular cover member edge in said groove.

7. In combination in a wheel cover assembly, a circular cover member having divergently related annular portions joined by a rib affording an annular channel opening in the direction of divergence of said annular portions, the radially outer of the annular portions having means thereon for retaining engagement with a wheel and other means thereon for retainingly engaging the edge of a second cover member within said channel.

8. In combination in a cover assembly of the character described, an inner cover member having an outwardly opening groove therein, an annular cover member arranged to have the inner edge thereof received in said groove, and spring clips carried by said inner cover member and engaging the edge of the annular cover member to retain the same in said groove, said clips having terminal flange retaining shoulder portions, and said groove having openings therethrough for passage of said terminal portions of the clips.

9. In combination in a cover assembly of the character described, a generally dished circular cover member having a central convex hub cap simulating portion and a marginal flange structure including divergently related flange portions, the radially inner of which joins the convex portion on a relatively sharp axially inwardly extending annular ridge and the flange portions being joined by a generally axially inwardly protruding annular rib affording an axially outwardly opening channel of substantial width, the radially outer of the marginal portions having a series of uniformly spaced generally radially outwardly extending retaining fingers for engagement with the flange of a tire rim of a wheel to which the cover may be applied, said radially outer flange portion having mounted thereon a series of retaining clips including generally gooseneck flexible retaining heads directed towards said channel, and a trim ring member of a magnitude and extent to conceal said outer marginal flange portion and the retaining fingers as well as said clips and having an inner beaded edge retained by said clips in assembly with the circular cover member in said channel.

10. In combination in a cover assembly of the character described, a generally dished circular cover member having a central convex hub cap simulating portion and a marginal flange structure including divergently related flange portions, the radially inner of which joins the convex portion on a relatively sharp axially inwardly extending annular ridge and the flange portions being joined by a generally axially inwardly protruding annular rib affording an axially outwardly opening channel of substantial width, the radially outer of the marginal portions having a series of uniformly spaced generally radially outwardly extending retaining fingers for engagement with the flange of a tire rim of a wheel to which the cover may be applied, said radially outer flange portion having mounted thereon a series of retaining clips including generally gooseneck flexible retaining heads directed towards said channel, and a trim ring member of a magnitude and extent to conceal said outer marginal flange portion and the retaining fingers as well as said clips and having an inner beaded edge retained by said clips in assembly with the circular cover member in said channel, said channel being wider than the beaded edge of the trim ring and being defined at the radially inner side thereof by a shoulder affording a fulcrum for a pry-off tool inserted between said shoulder and the beaded edge of the annular cover member for releasing the latter from said clips.

GEORGE ALBERT LYON.

REFERENCES CITED

The following references are of record in the file of this patent:

UNITED STATES PATENTS

| Number | Name | Date |
|---|---|---|
| Re. 22,042 | Lyon | Mar. 3, 1942 |
| 1,664,765 | Ash | Apr. 3, 1928 |
| 1,818,447 | Baker | Aug. 11, 1931 |
| 2,183,220 | Horn | Dec. 12, 1939 |
| 2,317,393 | Lyon | Apr. 27, 1943 |
| 2,368,230 | Lyon | Jan. 30, 1945 |